United States Patent
Hunziker et al.

(10) Patent No.: US 10,691,848 B2
(45) Date of Patent: Jun. 23, 2020

(54) DETERMINING THE BALLISTIC THRESHOLD VELOCITY FOR A COMPOSITE STRUCTURE USING MULTIPLE FAILURE MODELS

(71) Applicant: The Boeing Company, Chicago, IL (US)

(72) Inventors: Kenneth Joseph Hunziker, Issaquah, WA (US); Jaffar Sher Iqbal, Seattle, WA (US); Jenna Kristin Pang, Bellevue, WA (US); Mostafa Rassaian, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 67 days.

(21) Appl. No.: 15/898,984

(22) Filed: Feb. 19, 2018

(65) Prior Publication Data

US 2019/0258752 A1 Aug. 22, 2019

(51) Int. Cl.
*G06F 30/20* (2020.01)
*G06F 7/544* (2006.01)
*F41H 5/04* (2006.01)

(52) U.S. Cl.
CPC .............. *G06F 30/20* (2020.01); *G06F 7/544* (2013.01); *F41H 5/04* (2013.01)

(58) Field of Classification Search
None
See application file for complete search history.

(56) References Cited

U.S. PATENT DOCUMENTS

| | | | |
|---|---|---|---|
| 9,011,616 B2 | 4/2015 | Hunter et al. | |
| 9,464,872 B2* | 10/2016 | Dyke | F41H 5/0435 |
| 2015/0354925 A1* | 12/2015 | Van Heerden | F41H 5/0485 |
| | | | 428/113 |
| 2016/0052214 A1 | 2/2016 | Gilbert et al. | |
| 2016/0139016 A1 | 5/2016 | Kismarton et al. | |
| 2016/0224698 A1 | 8/2016 | Rassaian et al. | |

* cited by examiner

*Primary Examiner* — Christle I Marshall
(74) *Attorney, Agent, or Firm* — Coats + Bennett, PLLC (57) ABSTRACT

A composite structure, such as a laminated composite panel, for example, comprises one or more layers or "plies" embedded in a matrix material or otherwise fixed together in an arrangement, commonly referred to as a "stack up." Each material in the structure has a corresponding material failure model (MFM) defining the physical characteristics of that material. A ballistic threshold velocity computing device obtains the MFMs for each material in the composite structure, generates a predicted ballistic velocity threshold velocity for each MFM, and then generates a parametric model to compute a composite ballistic velocity threshold velocity for the composite structure.

20 Claims, 8 Drawing Sheets

DETERMINING THE BALLISTIC THRESHOLD VELOCITY FOR A COMPOSITE STRUCTURE USING MULTIPLE FAILURE MODELS

STATEMENT OF POTENTIAL GOVERNMENT RIGHTS

The invention described herein was made in the performance of work under NASA Contract No. NNL09AA00A and is subject to the provisions of Section 305 of the National Aeronautics and Space Act of 1958 (72 Stat. 435: 42 U.S.C. 2457).

TECHNICAL FIELD

The present disclosure relates generally to the field of material failure analysis, and more particularly, to predicting the ballistic threshold velocity for a composite structure using a plurality of material failure models (MFMs).

BACKGROUND

The ballistic threshold velocity $V_{50}$ is defined as the velocity at which a projectile penetrates a material 50% of the time. Knowing $V_{50}$ is beneficial when designing a structure that can adequately withstand a ballistic impact from a projectile travelling at a given velocity. Historically, values for $V_{50}$ are determined for a given material using one of two methods. Particularly, the $V_{50}$ of a given material can be determined through extensive ballistics testing. Such testing is accurate and can be performed regardless of whether the material under test is a single isotropic material or a composite material. However, it is also expensive, time consuming, and can be very complex.

Alternatively, an explicit finite element analysis (FEA) can be performed to predict the $V_{50}$ of the given material. These types of analyses help to avoid the time, expense, and complexity associated with extensive ballistics testing. However, not only are conventional analytical methods are limited in their accuracy, but have historically proven to be incapable of accommodating complex materials, such as materials that are more complex than single isotropic materials. Moreover, the results obtained using conventional analytical methods have historically been inaccurate when applied to complex materials having a complex shape.

BRIEF SUMMARY

Aspects of the present disclosure relate to a device and technique for computing the ballistic threshold velocity $V_{50}$ for a composite structure, such as a laminated composite panel, for example, using multiple material failure models (MFMs). More particularly, the composite structure comprises one or more layers or "plies" embedded in a matrix material or otherwise fixed together in an arrangement, commonly referred to as a "stack up." The layers are of different materials, and the composite structure has a plurality of MFMs. Each MFM comprises information and data defining the characteristics and physical properties of the materials comprising the layers in the composite structure. Aspects of the present disclosure determine a corresponding $V_{50}$ value for each MFM associated with the composite structure, and generate a parametric model for the composite structure from those values in which each $V_{50}$ value is weighted. So generated, aspects of the present disclosure utilize the parametric model to determine a composite $V_{50}$ value for the composite structure.

In one aspect, a ballistic threshold velocity computing device comprises a communication interface circuit and a processing circuit operatively connected to the communication circuit. The communication interface circuit communicates data with one or more devices over a communications network. The processing circuit generates a parametric model configured to aggregate predicted ballistic threshold velocities of a plurality of material failure models (MFMs), wherein each predicted ballistic threshold velocity in the parametric model has a corresponding weighting coefficient to be applied to the predicted ballistic threshold velocity, determine a value for each weighting coefficient in the parametric model, and generate a composite ballistic threshold velocity for the laminated composite panel from the parametric model.

In one aspect, each MFM comprises data defining one or both of a characteristic and a physical property of materials comprising the laminated composite panel.

In another aspect, the processing circuit generates the predicted ballistic threshold velocity for each MFM according to a selected finite element analysis solving algorithm. In these aspects, the finite element analysis solving algorithm used to generate the predicted ballistic threshold velocity for a first MFM is different than the finite element analysis solving algorithm used to generate the predicted ballistic threshold velocity for a second MFM.

In one such aspect, the processing circuit is configured to generate at least one predicted ballistic threshold velocity using a stress-based failure analysis of the laminated composite panel.

In another such aspect, the processing circuit is configured to generate at least one predicted ballistic threshold velocity using a fracture-based failure analysis of the laminated composite panel.

In another such aspect, the processing circuit is configured to generate at least one predicted ballistic threshold velocity using a continuum damage failure analysis of the laminated composite panel.

In one aspect, to determine a value for each weighting coefficient, the processing circuit is configured to fit the parametric model to empirical test data for the laminated composite panel responsive to determining that the empirical test data is accessible. However, it the processing circuit determines that no empirical test data is accessible, the processing circuit is configured to obtain the weighting coefficients from a previously generated parametric model.

In one aspect of the disclosure, the processing circuit is configured to determine whether the composite ballistic threshold velocity is within a predetermined range of a reference ballistic threshold velocity.

In another aspect, the present disclosure provides a method of determining a ballistic threshold velocity for a laminated composite panel. In this aspect, the method comprises generating a parametric model configured to aggregate predicted ballistic threshold velocities of a plurality of material failure models (MFMs). Each predicted ballistic threshold velocity in the parametric model has a corresponding weighting coefficient to be applied to the predicted ballistic threshold velocity. The method also comprises determining a value for each weighting coefficient in the parametric model, and then generating a composite ballistic threshold velocity for the laminated composite panel from the parametric model.

In one aspect, the method further comprises generating the predicted ballistic threshold velocity for each MFM using a corresponding different finite element analysis solving algorithm. In one aspect, at least one predicted ballistic threshold velocity is generated using a stress-based failure analysis of the laminated composite panel. In another aspect, at least one predicted ballistic threshold velocity is generated using a fracture-based failure analysis of the laminated composite panel. In still another aspect, at least one predicted ballistic threshold velocity is generated using a continuum damage failure analysis of the laminated composite panel.

In one aspect, the method further comprises generating a structural design for the laminated composite panel according to the predicted composite ballistic threshold velocity generated for the laminated composite panel.

Further, in one aspect, the method further comprises creating the laminated composite panel according to the predicted composite ballistic threshold velocity generated for the laminated composite panel.

In one aspect, responsive to determining that empirical test data is accessible, determining a value for each weighting coefficient in the parametric model comprises fitting the parametric model to the empirical test data for the laminated composite panel.

In one aspect, determining a value for each weighting coefficient in the parametric model comprises obtaining the weighting coefficients from a previously generated parametric model responsive to determining that the empirical test data is not accessible.

In one aspect, the method further comprises determining whether the composite ballistic threshold velocity is within a predetermined range of a reference ballistic threshold velocity.

In one aspect, the present disclosure provides a non-transitory computer-readable medium storing a computer program product configured to control a programmable computing device. The computer program product comprises software instructions that, when executed by processing circuitry of the programmable computing device, causes the processing circuitry to generate a parametric model configured to aggregate predicted ballistic threshold velocities of a plurality of material failure models (MFMs), wherein each predicted ballistic threshold velocity has a corresponding weighting coefficient to be applied to the MFM, fit the parametric model to empirical test data to determine a value for each weighting coefficient in the parametric model, and generate a predicted composite ballistic threshold velocity for the laminated composite panel from the parametric model.

BRIEF DESCRIPTION OF THE DRAWINGS

Aspects of the present disclosure are illustrated by way of example and are not limited by the accompanying figures with like references indicating like elements.

DETAILED DESCRIPTION

Aspects of the present disclosure relate to ballistic impact modeling for "composite structures" comprising multiple materials. Such composite structures include, but are not limited to, laminated composite panels comprising a plurality of different material layers.

The ballistic threshold velocity $V_{50}$ is defined as the velocity at which a projectile penetrates a given material 50% of the time. Usually, values for $V_{50}$ are determined through extensive ballistic testing on the materials. However, in many cases, such experimentation is not possible, very costly, or simply not efficient to implement. Therefore, alternatively, $V_{50}$ can be estimated using known finite element analysis (FEA) techniques. With these techniques, computers estimate the $V_{50}$ of a given material to predict how certain ballistic-related stresses and loads will affect that particular material. Regardless of whether $V_{50}$ is determined through experimentation or by utilizing a predictive FEA approach, though, $V_{50}$ is generally determined on a per-material basis. For computational estimations using FEA, $V_{50}$ is estimated based on the characteristics and physical properties of the material, which are defined in a corresponding file referred to as a Material Failure Model (MFM).

Conventional FEA techniques can usually accurately predict the $V_{50}$ of a single isotropic material only. However, structures are not always comprised of a single isotropic material. In fact, in many practical situations, structures are "composite structures" of various shapes and sizes comprising a plurality of different materials arranged in layers. With such multi-layered composite structures, each different material and layer can, and usually does, behave differently under different stresses and loads.

Unfortunately, due to the extremely complex interaction of the constituent materials of a composite structure, the response of each individual material and layer to a given ballistic-related stress or load is difficult to predict. Some MFMs have been developed to deal with these complex interactions for various typical loading conditions; however, none perform well under ballistic loads where many atypical failure modes and interactions can exist. Further, when estimating $V_{50}$ for a multi-layer composite structure, existing software tools do not consider multiple different MFMs in their analysis. Rather, existing tools estimate $V_{50}$ for a composite structure based only on a single MFM. Such difficulties could be because multiple different MFMs require different finite element method models to perform. As such, the MFMs are not consolidated. Additionally, the different MFMs could require different types of finite element model mesh, for example. Such requirements would make it cumbersome to update the models and maintain consistency, for example.

When performing a finite element analysis (FEA) for a composite multi-layer structure, it is possible to arrive at an accurate solution by altering the physical properties of a given single material for a specific structural configuration; however, altering the physical properties requires prior knowledge of the results of the testing for each specific structural configuration. Further, the test results achieved using the alterations for one structural configuration typically do not relate well to the results achieved for other altered configurations.

Thus, conventional FEA methods can leave the resultant $V_{50}$ predictions subject to error. These errors can potentially be very large, especially in cases where when the alterations affect certain structural parameters, such as the number of layers in the structure, the size and/or curvature of the structure, the features of the structure, and the like. Further, these large errors breed a lack of confidence in the estimated $V_{50}$, and are one reason why conventional FEA techniques for estimating $V_{50}$ in multi-layer composite structures are generally not widely accepted.

Accordingly, aspects of the present disclosure provide a method and corresponding device configured to predict or estimate a $V_{50}$ for a composite multi-layer structure, such as a laminated composite panel, for example, using a plurality of MFMs. As described in more detail below, aspects of the disclosure determine a corresponding individual $V_{50}$ values for the composite multi-layer structure using each of a plurality of individual MFMs associated with the composite multi-layer structure. The aspects then aggregate those individual $V_{50}$ values to predict or estimate a "composite $V_{50}$" for the composite multi-layer structure.

Aggregating the individual $V_{50}$ values for the composite multi-layer structure allows the present disclosure to overcome the above-identified deficiencies of conventional analyses. In particular, aspects of the present disclosure maintain multiple MFMs, as well as multiple different finite element models. This makes it easier to update the models and maintain consistency across the models, for example. Further, the disclosed method reduces the possibility that the resultant composite $V_{50}$ value will fail to substantially match the test data for, or the real world behavior of, the composite multi-layer structure under a ballistic load. The resultant estimated composite $V_{50}$ is therefore more accurate and robust than the individual $V_{50}$ values that are determined using the plurality of individual MFMs associated with the composite structure.

Figure 1:
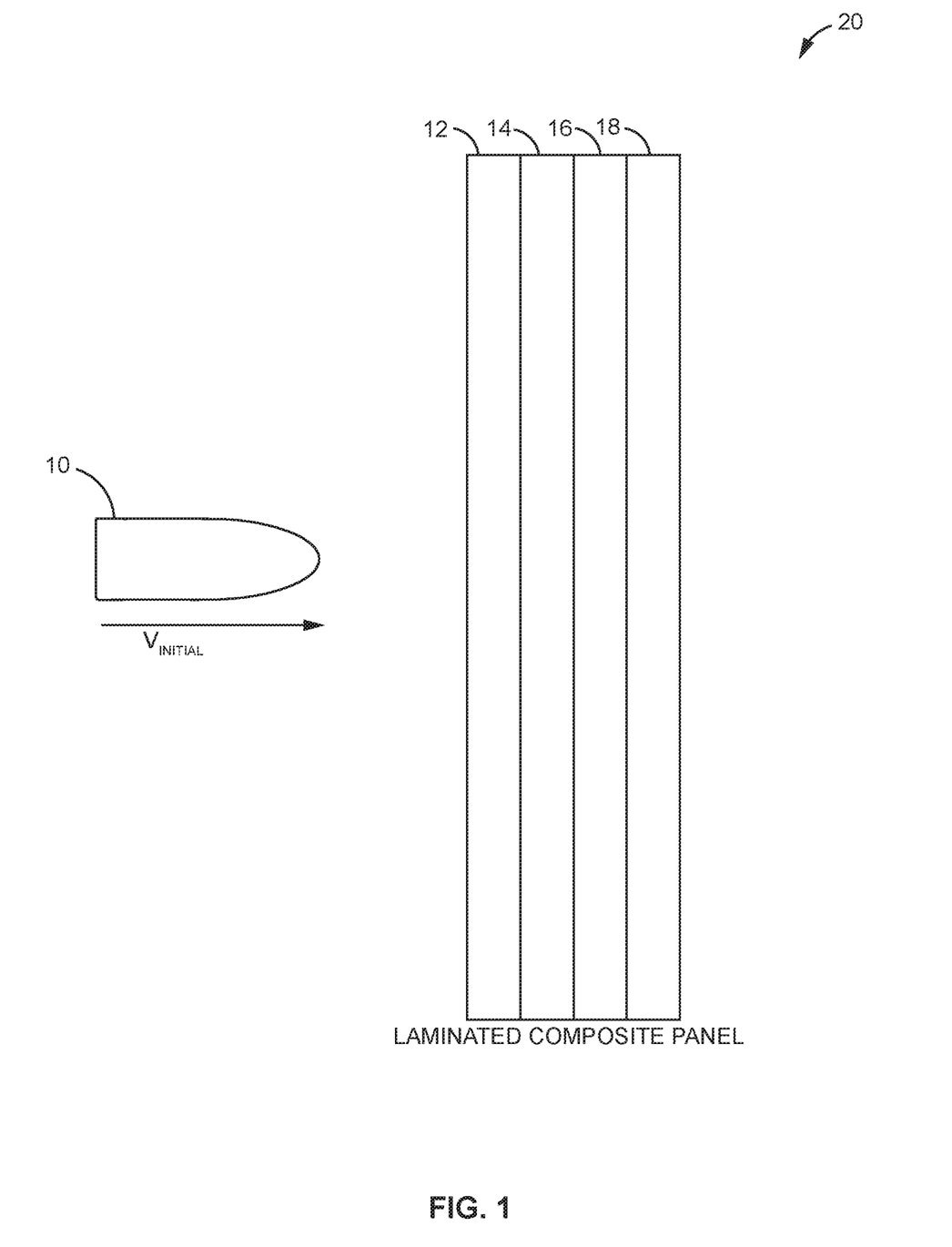
FIG. 1 is a schematic drawing illustrating a projectile travelling towards an impact with a laminated composite panel according to one aspect of the present disclosure.

Turning now to the drawings, FIG. 1 illustrates one aspect of the present disclosure in which a projectile 10 travels at a given velocity $V_{INITIAL}$ towards a composite multi-layered structure, such as laminated composite panel 20. In this aspect, a composite $V_{50}$ for panel 20 is computed based on the individual $V_{50}$ values that are determined by processing each of a plurality of MFMs associated with panel 20.

In more detail, panel 20 comprises a plurality of layers of material adhered to each other. As those of ordinary skill in the art should appreciate, the particular number of layers and type of materials of those layers are not germane to the aspects described herein. However, for illustrative purposes only, FIG. 1 illustrates panel 20 as having four layers—namely, a pair of carbon fiber tape layers 12, 16 interleaved with a pair of carbon fiber plain weave fabric layers 14, 18.

Panel 20 has a plurality of MFMs that are stored in memory. Each MFM comprises information and data defining the characteristics and physical properties of the materials comprising the panel 20, and is used in a corresponding finite element analysis to produce a respective $V_{50}$ value. There are a variety of different methods and techniques for calculating the $V_{50}$ from each individual MFM; however, one aspect of the disclosure computes the individual $V_{50}$ values using multiple different finite element analyses.

By way of example only, in the aspect of FIG. 1, panel 20 is associated with two MFMs, although as previously described, panel 20 can be associated with more than two MFMs. A first MFM comprises a MAT162 material model, for example, while the second MFM comprises a MAT261 material model. Both the MAT162 and MAT261 material models are well-known in the art and utilized, for example, by known multiphysics simulation software applications such as LS-DYNA developed by the Livermore Software Technology Corporation. However, for clarity, the MAT162-based MFMs comprise parameters used to simulate the damage caused by projectile 10 to each corresponding layer 12, 14, 16, and 18 of panel 20 using a stress-based failure criterion. The MAT261-based MFMs comprise parameters used to simulate the damage caused to each corresponding layer 12, 14, 16, and 18 of panel 20 using a fracture-based failure criterion.

Those of ordinary skill in the art should appreciate that the particular number and types of material layers 12, 14, 16, 18 of panel 20, as well as the particular arrangement of material layers 12, 14, 16, 18 in panel 20, is illustrative only. So, too, are the particular types of MFMs and FEA solving algorithms that are used to simulate the effects of projectile 10 on each individual layer 12, 14, 16, and 18 of panel 20. Indeed, other materials, layer configurations, MFMs, and methods for analyzing the effects of projectile 10 on the various individual layers 12, 14, 16, 18 of panel 20 are possible, and thus, aspects of the disclosure described herein are not limited solely to the particular layers, materials, and methods expressly identified herein.

Figure 2:
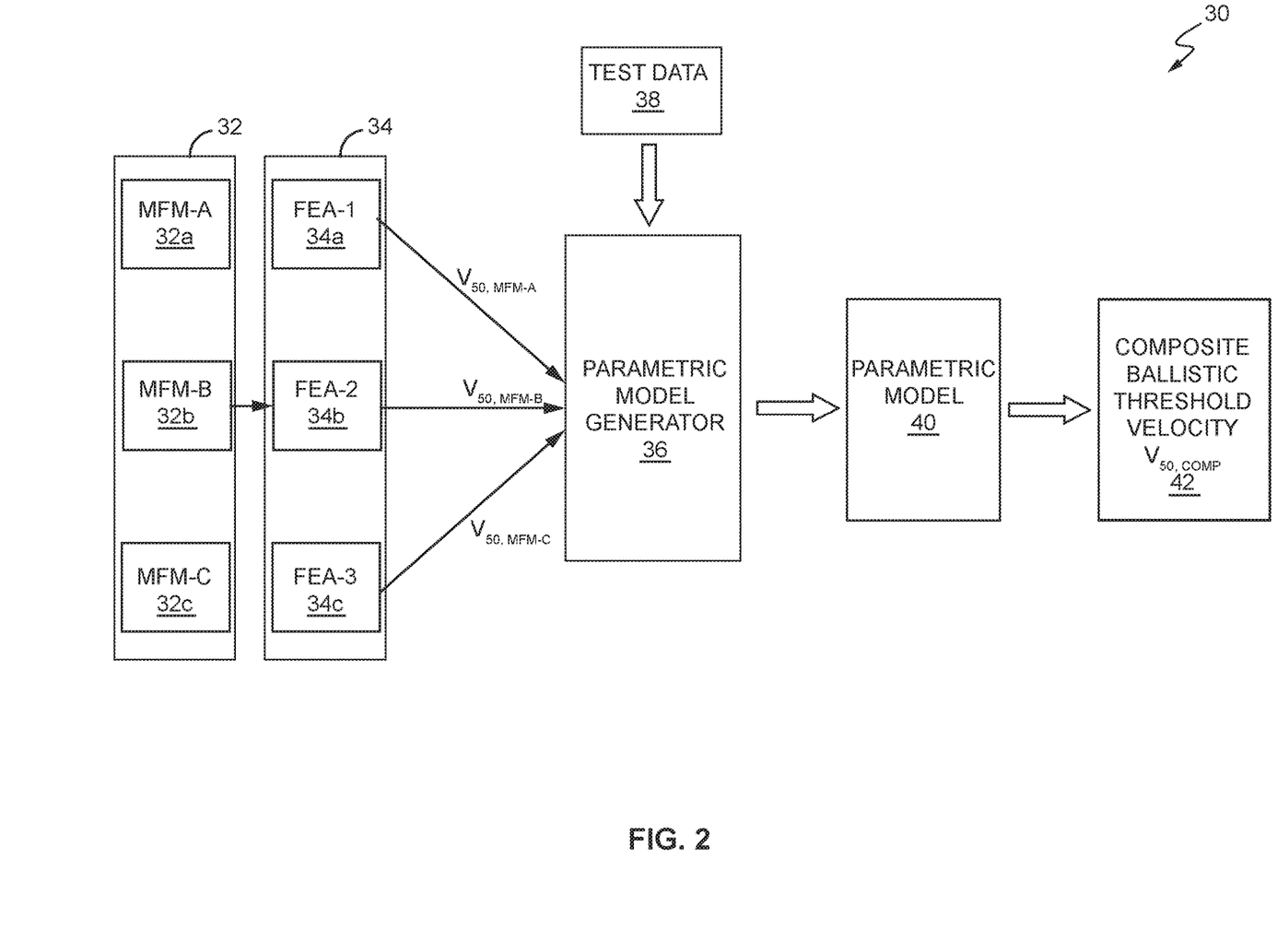
FIG. 2 is a block diagram illustrating the functionality of a device configured to determine a ballistic threshold velocity $V_{50}$ for a laminated composite panel according to one aspect of the present disclosure.

FIG. 2 is a block diagram illustrating the functional components of a device configured to determine a composite $V_{50}$ for a laminated composite panel 20 according to one aspect of the present disclosure. As seen in FIG. 2, the functional components comprise a plurality of MFMs—MFM-A 32a, MFM-B 32b, and MFM-C 32c (collectively, MFMs 32), a plurality of finite element analysis functions—FEA-1 34a, FEA-2 34b, and FEA-3 34c (collectively, FEAs 34), and a parametric model generator 36. Each individual MFM 32 comprises data and information related to the behavior of the materials in panel 20 under a given set of constraints, such as a stress or load imparted by projectile 10. Each FEA 34 comprises a function configured to perform a finite element analysis on a corresponding one of the MFMs 32, and from that analysis, determine a respective $V_{50}$ value defining the ballistic threshold velocity for the materials in panel 20. So determined, each FEA 34 provides its respective $V_{50}$ value as input into the parametric model generator 36, which then generates a parametric model 40 configured to determine the composite $V_{50}$ value.

For example, in the aspect of FIG. 2, MFM-A 32a comprises data related to the behavior of a material in panel 20 that is input into a fracture-based analysis function implemented by FEA-1 34a. MFM B 32b comprises data related to the behavior of a material in panel 20 that is input into a stress-based analysis function implemented by FEA-2 34b. MFM-C 32c comprises data related to the behavior of a material in panel 20 that is input into a tensile-based analysis function implemented by FEA-3 34c. Regardless of the particular type of analysis performed, however, each FEA 34 produces a respective $V_{50}$ value for the materials comprising panel 20 for input into the parametric model generator 36.

The parametric model generator 36, in turn, "fits" the individual $V_{50}$ values into a parametric model 40 based on test data 38, which then outputs a composite $V_{50}$ value 42 for panel 20. In at least one aspect of the present disclosure, the computed composite $V_{50}$ value 42 is stored in a memory in a corresponding predicted composite threshold velocity file.

The parametric model generator 36 can utilize any of a variety of methods to generate the estimated composite $V_{50}$ value according to the present disclosure. In one aspect, however, the parametric model generator 36 computes an estimated composite $V_{50}$ value according to the following general formula.

$$V_{50,COMP} = P_1 * V_{50,MAT162} + P_2 * V_{50,MAT261} \quad (1)$$

where:
- $V_{50,COMP}$ is the composite $V_{50}$ value for a composite structure (e.g., panel 20) in which a plurality of MFMs are considered in the analysis;
- $V_{50,MAT162}$ is a first individual $V_{50}$ value for the materials in the composite structure, and is determined using a MAT162 MFM;
- $V_{50,MAT261}$ is a second individual $V_{50}$ value for the materials in the composite structure, and is determined using a MAT261 MFM; and
- $P_{1 \ldots n}$ are weighting parameter coefficients for each determined individual $V_{50}$.

In more detail, the parametric model generator 36 in one aspect of the disclosure first computes the corresponding values for each coefficient $P_{1 \ldots n}$. To accomplish this, one aspect of the parametric model generator 36 selects successive values for each coefficient $P_{1 \ldots n}$ and plugs those values into equation (1) above. Parametric model generator 36 then solves for $V_{50, COMP}$ using the selected coefficients and the individual $V_{50}$ values. This process continues until the computed $V_{50, COMP}$ falls within a predetermined range R of a "test value" $V_{50, TEST}$ for that structure. The "test values" can be obtained, for example, using explicit materials testing.

By way of example, consider a two-ply panel 20 in which the first layer of material comprises a carbon fiber tape and the second layer of material comprises a carbon fiber plain weave fabric. In this example:
- $V_{50, MAT162} = 100$ ft/sec;
- $V_{50, MAT261} = 300$ ft/sec;
- $V_{50, TEST} = 210$ ft/sec;
- R=±25 ft/sec; and
- $P_1$, $P_2 = 0.5$.

With conventional techniques (i.e., using only the $V_{50}$ for a single material in the composite structure), the result for $V_{50, COMP}$ would be selected as being either 100 ft/sec, or 300 ft/sec. As stated above, however, the selected answer may be highly inaccurate and far removed from the $V_{50, TEST}$ value associated with the empirical test data 38. With the present disclosure, however, the $V_{50}$ for each individual MFM would be utilized in the above equation to yield:

$$V_{50, COMP} = (P_1 * V_{50,MAT162}) + (P_2 * V_{50,MAT261})$$

$$V_{50, COMP} = (0.5 * 100) + (0.5 * 300)$$

$$V_{50, COMP} = 200 \text{ ft/sec}$$

Figure 3:
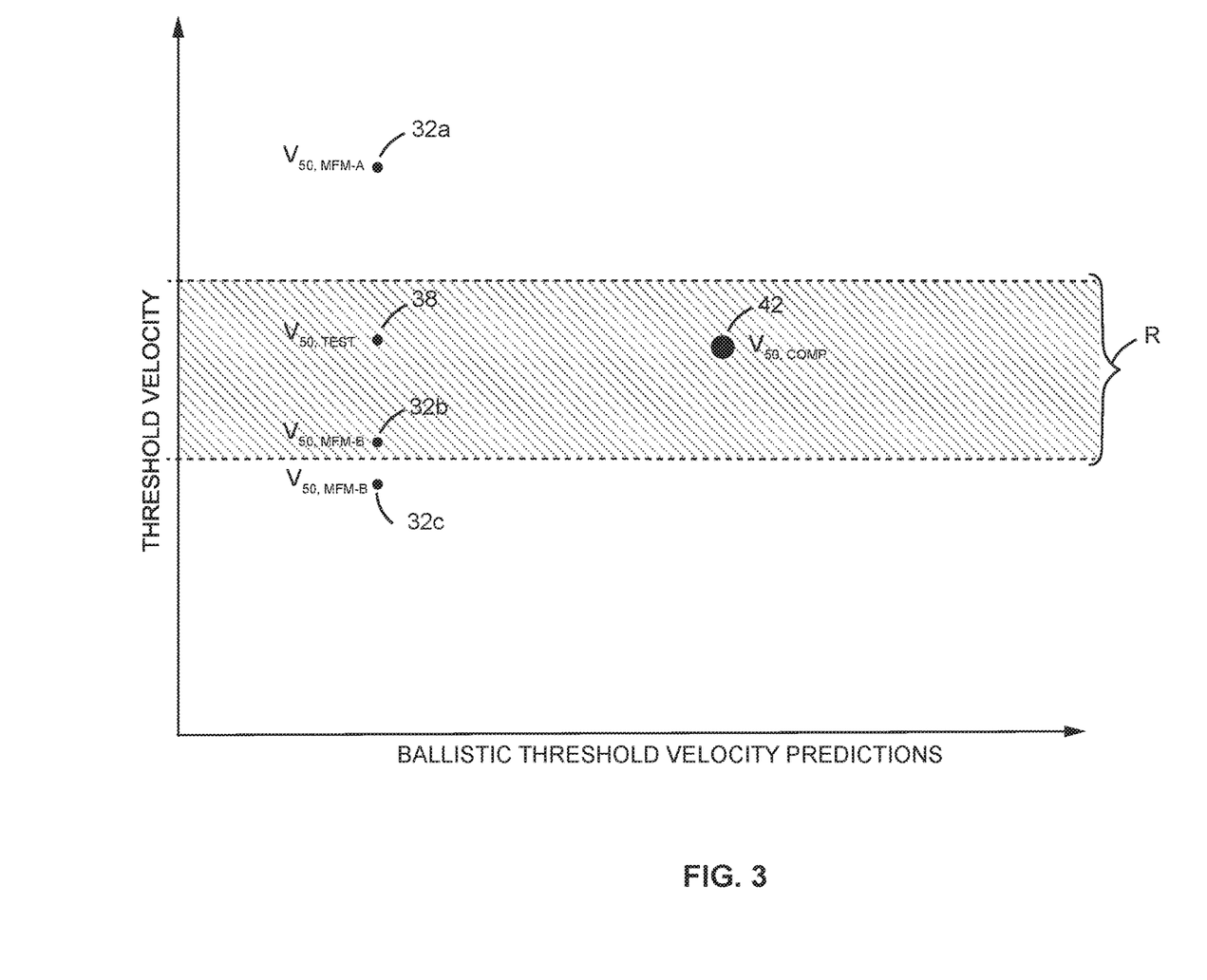
FIG. 3 is a graph comparing the individual ballistic threshold velocities $V_{50}$ determined through experimentation and/or prediction for each of a plurality of MFMs to a composite ballistic threshold velocity $V_{50}$ determined according to one aspect of the present disclosure.

As seen in FIG. 3, the resultant $V_{50, COMP}$ 42 is very close to, and within a predefined range R of, the $V_{50, TEST}$ value associated with test data 38.

Figure 4A:
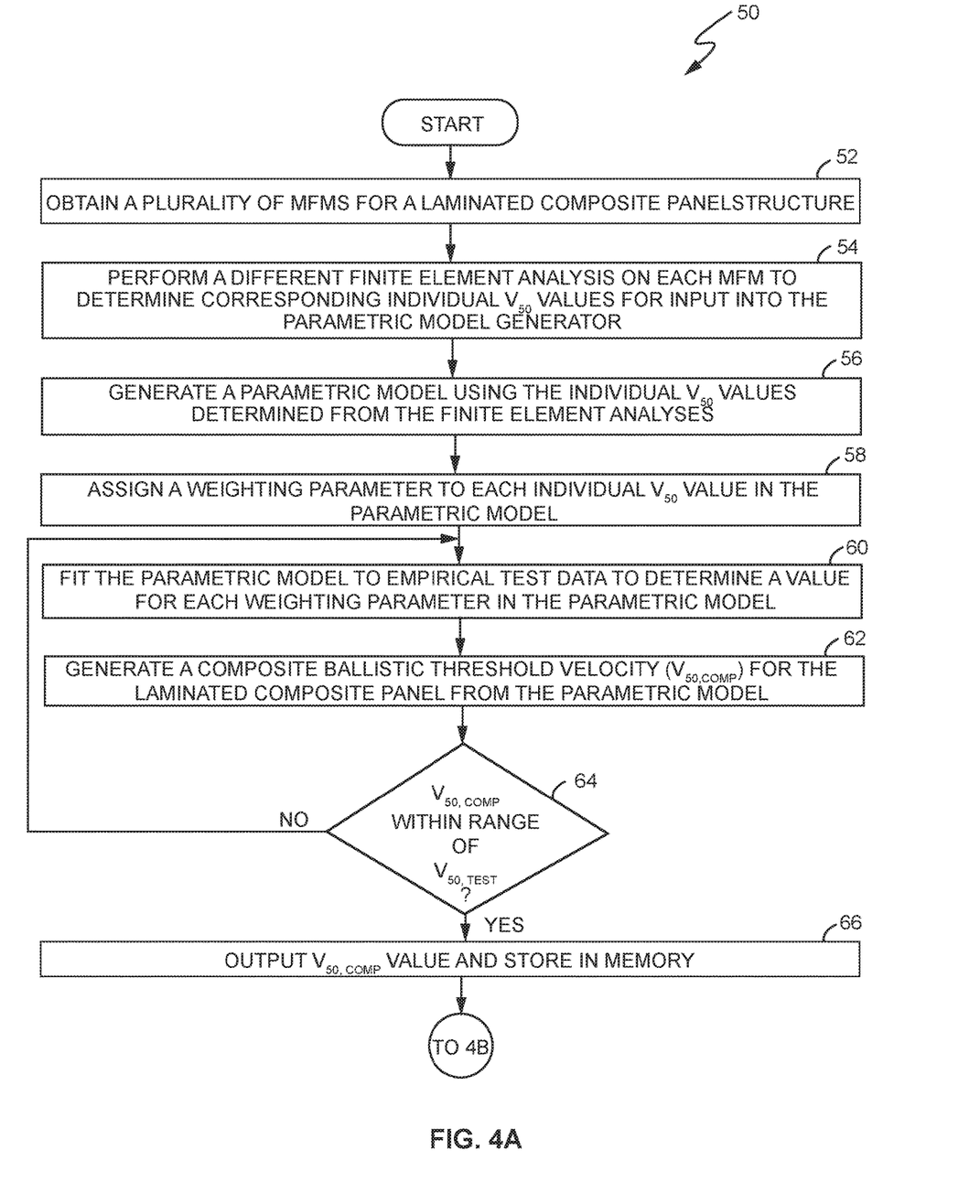
FIGS. 4A-4B are flow diagrams illustrating a method for determining a composite ballistic threshold velocity $V_{50}$ according to one aspect of the present disclosure.
Figure 4B:
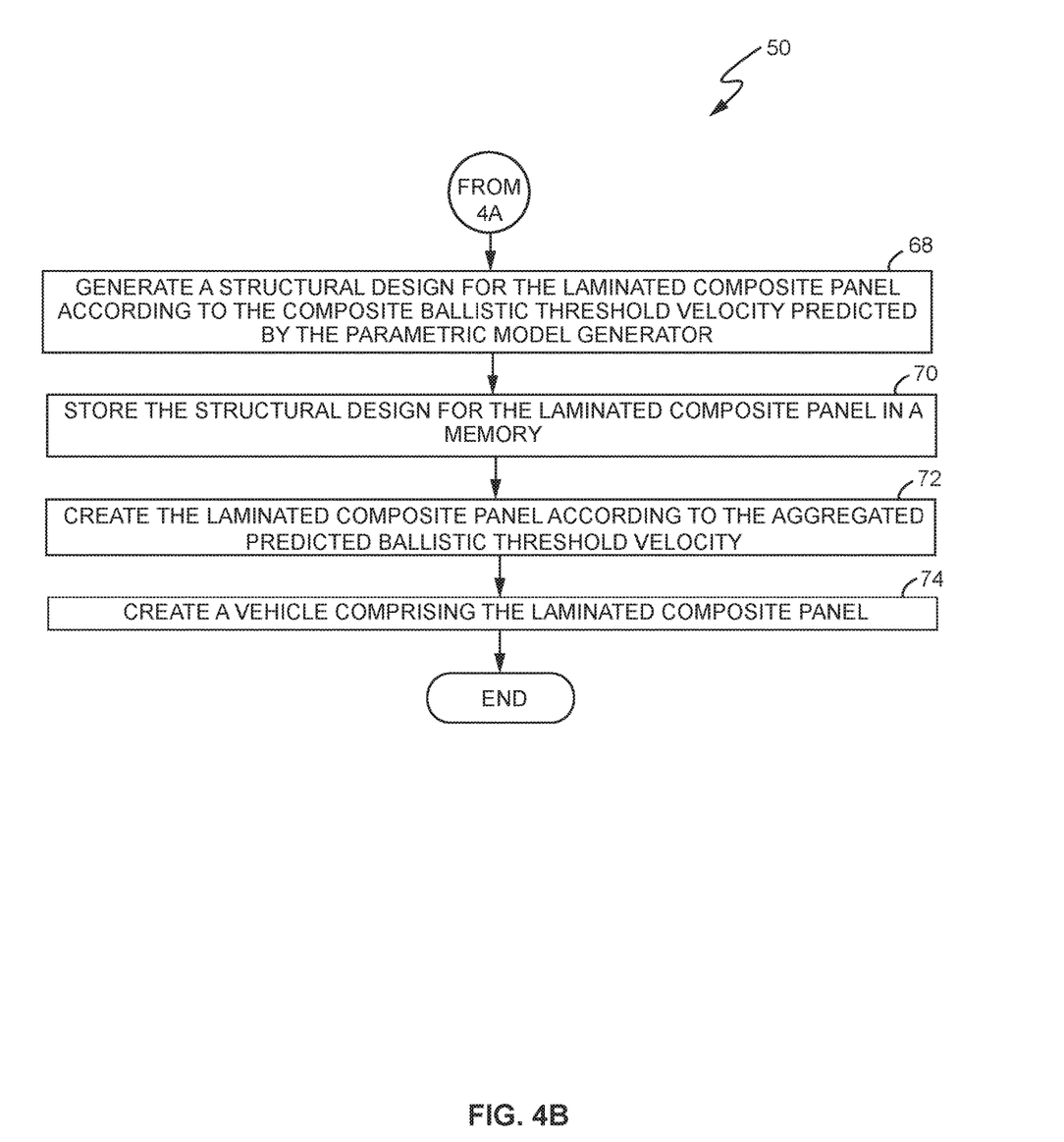

FIGS. 4A-4B are flow diagrams illustrating a method 50 for determining a composite $V_{50}$ for a laminated composite panel 20 according to one aspect of the present disclosure. As seen in method 50, a computing device implementing the method first obtains a plurality of MFMs 32 for panel 20 (box 52). In some aspects, the computing device obtains each of the MFMs 32 from a memory, while in other aspects, the computing device generates some or all of the MFMs 32 using an appropriate solving algorithm. In at least one aspect, the computing device implementing method 50 generates the contents for one or more of the MFMs 32 and retrieves other MFMs 32 from memory. Regardless of how the MFMs 32 are obtained, however, each individual MFM 32, as previously stated, contains data and information related to the behavior of the materials comprising panel 20 under a given set of constraints, such as a stress or load imparted by projectile 10.

Once the MFMs 32 are generated or obtained, method 50 determines a $V_{50}$ value for each individual MFM 32 (box 54). As previously described, one aspect of the disclosure determines the individual $V_{50}$ values by performing a different finite element analysis on each individual MFM 32. However, in cases where the data and information for a given MFM 32 also comprises its $V_{50}$ value, aspects of the present disclosure are configured to simply extract that $V_{50}$ value from the MFM 32. Irrespective of the particular method for determining the individual $V_{50}$ values, however, method 50 inputs each of the individual $V_{50}$ values into the parametric model generator 36.

The parametric model generator 36 then uses the individual $V_{50}$ values to generate the parametric model 40 (e.g., equation (1)) (box 56). In one aspect, the parametric model generator 36 also assigns a weighting parameter $P_1 \ldots P_n$ to each individual $V_{50}$ value in the generated model 40 (box 58). So generated, aspects of the present disclosure utilize the generated parametric model 40 to determine the composite $V_{50}$ value for panel 20.

To determine the composite $V_{50}$ value, one aspect of the disclosure calls for performing a regression analysis. Particularly, as stated above, the parametric model 36 is fit to empirical test data 38 to determine a scalar value for each different weighting parameter/'I', in the generated parametric model 40 (box 60). Then, based on the obtained values, method 50 generates the composite $V_{50}$ value by solving equation (1) with each individual $V_{50}$ (box 62). As previously stated, the composite $V_{50}$ value is tested to determine its accuracy (e.g., whether the composite $V_{50}$ value falls within a predetermined range of a $V_{50}$ test value) (box 64). If not, the regression analysis is repeated with new scalar values being used for one or more of the weighting parameters $P_1 \ldots P_n$ in the generated parametric model 40 (boxes 60, 62). However, if the composite $V_{50}$ value does fall within the predetermined range (box 64), method 50 outputs the composite $V_{50}$ value and stores the value in memory (box 66).

The stored composite $V_{50}$ value can then be utilized for a variety of purposes, as seen in FIG. 4B. In one aspect, for example, the composite $V_{50}$ value is subsequently utilized to generate a structural design for the laminated panel 20 (box 68). By way of example only, one aspect of the present disclosure provides the composite $V_{50}$ value to a software application as an input parameter defining a design constraint. Once the design is complete, one or more design files comprising the generated design, and an MFM generated for the panel 20, are stored in memory (box 70). The generated design files can then be subsequently utilized in the creation of a physical panel 20 (box 72), as well as a vehicle or other object (e.g., an aircraft, a spacecraft, anti-ballistic protective articles such as helmets, vests, etc.) that comprises the physical panel (box 74).

Additionally, the composite $V_{50}$ can be used in one aspect of the disclosure to optimize the laminated panel 20. By enabling the design of the laminated panel 20 to have a minimum weight while at the same time maintaining a predetermined minimal ballistic threshold velocity across the entire panel. For example, aspects of the present disclosure can be performed iteratively to optimize a given panel 20. In particular, some panels 20 could comprise various structural complexities, such as steered fibers, plies that are removable and/or replaceable, and the like. Running aspects of the present disclosure iteratively could improve the resultant composite $V_{50}$ value based on one or more previously determined $V_{50}$ values.

Although the aspect described in connection with FIGS. 4A-4B mentions "fitting" the parametric model 40 to test data 38, the present disclosure is not limited to cases where test data 38 exists for a given configuration of panel 20. In at least one aspect, the parametric model 40 generated for a panel 20 in a given configuration can be utilized to generate a composite $V_{50}$ value for a panel 20 in a new configuration even when no test data 38 exists for the panel 20 in the new configuration. Particularly, so long as panel 20 in the new configuration comprises substantially the same materials as panel 20 in another configuration, aspects of the present disclosure would be configured to simply utilize the weighting coefficients $P_1 \ldots _n$ previously determined for that other configuration of panel 20. Thus, according to the aspects of the present disclosure, a parametric model 40 generated for one configuration of a panel 20 based on test data existing for that configuration of panel 20 can be beneficially utilized to predict a composite $V_{50}$ value for panels 20 in other configurations that do not have corresponding test data 38.

Additionally, or alternatively, one or more of the weighting coefficients $P_1 \ldots P_n$ used to generate parametric model 40 could be obtained from a library of appropriate weighting coefficients stored in memory. Such a library, in one aspect of the disclosure, maintains one or more lists of appropriate weighting coefficients $P_1 \ldots P_n$ for various composite structures based on the "stack up" characteristics (e.g. number of plies, type of plies, material of plies, matrix material, etc.). The library may be dynamic in that new data in the one or more lists can be added, deleted, or modified based on test data, for example.

The weighting coefficients $P_1 \ldots P_n$ can be configured for any value needed or desired. In one aspect, however, the value of any given co-efficient P is such that P≥0. In more detail, many MFMs used to generate a given parametric model 40 can be weighted. However, if a given MFM is not appropriate for the panel 20 for which the parametric model 40 is generated, or if the given MFM is associated with a material considered to have minimal importance to the panel 20, for example, than the weighting coefficient $P_n$ for that given MFM could be set to, or equal to, zero. A weighting factor of zero essentially negates the information in its associated MFM from consideration in the analysis. Thus, it is possible, for example, to have fewer FEM models and/or fewer FEM analysis operations when determining the composite $V_{50}$ value for panel 20, thereby saving time and computational resources.

Figure 5:
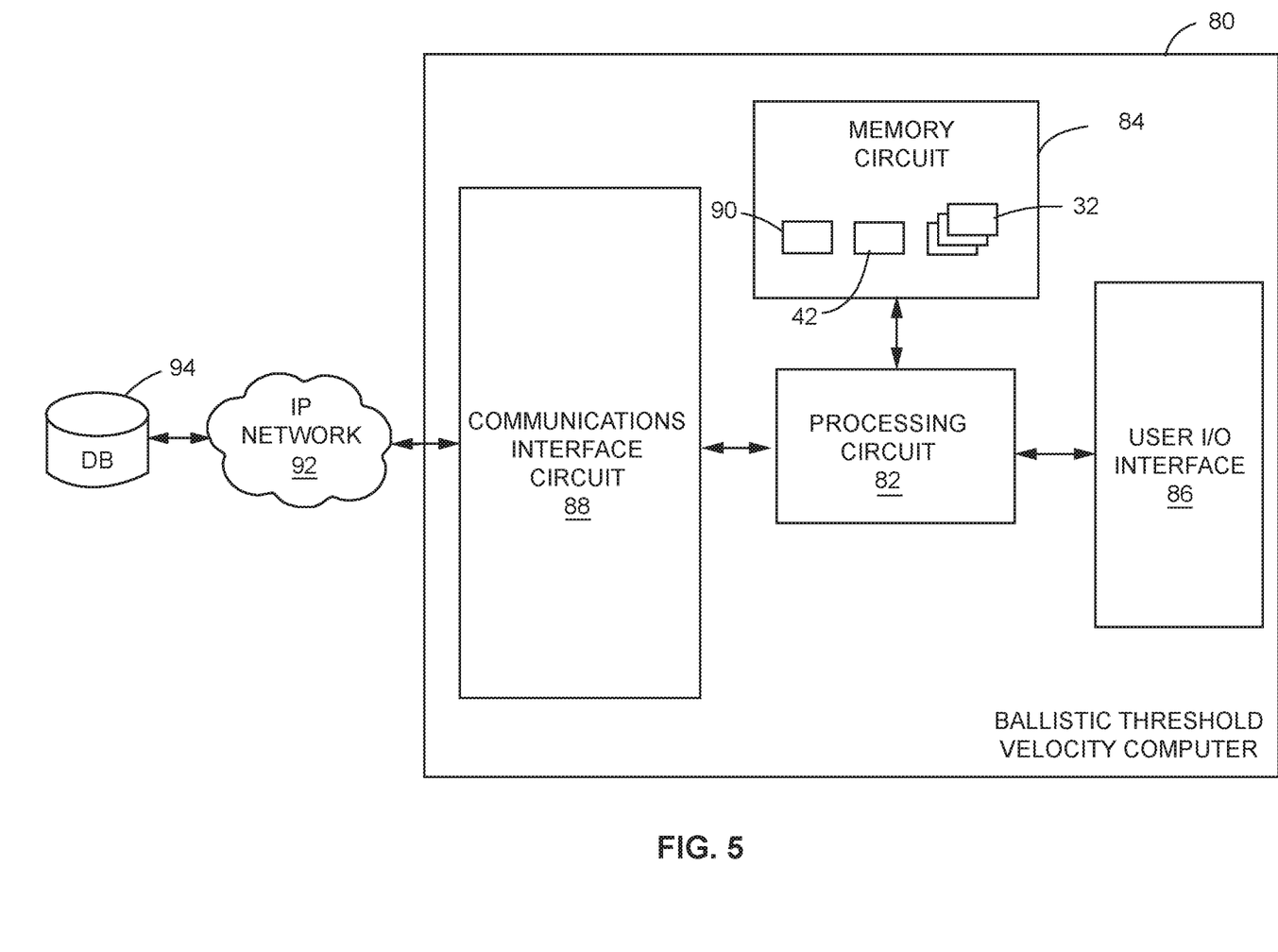
FIG. 5 is a block diagram illustrating some components of a computing device configured to determine a composite ballistic threshold velocity $V_{50}$ according to one aspect of the present disclosure.

FIG. 5 is a block diagram illustrating a Ballistic Threshold Velocity Computer (BTVC) 80 configured to determine a composite $V_{50}$ for a laminated composite panel 20 according to one or more aspects of the present disclosure. As seen in FIG. 5, BTVC 80 comprises a processing circuit 82, a memory circuit 84, a user input/output (I/O) interface 86, and a communications interface circuit 88.

According to various aspects of the present disclosure, processing circuit 82 comprises one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. In one aspect, processing circuit 82 includes programmable hardware capable of executing software instructions stored, e.g., as a machine-readable computer control program 90 in memory circuit 84. Processing circuit 82 is configured to execute control program 90 to perform the previously described aspects of the present disclosure.

Memory circuit 84 comprises any non-transitory machine-readable storage media known in the art or that may be developed, whether volatile or non-volatile, including (but not limited to) solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, individually or in any combination. As seen in FIG. 5, memory circuit 84 is configured to store a computer program product (e.g., control program 90) comprising the instructions executed by processing circuit 82 to perform the previously described aspects of the present disclosure. Additionally, memory circuit 84 is configured to store a generated parametric model 40 configured to aggregate the predicted $V_{50s}$ of a plurality of MFMs 32 to produce a composite $V_{50}$ of panel 20, as previously described.

The user I/O interface 86 comprises circuitry configured to control the input and output (I/O) data paths of the BTVC 80. The I/O data paths include those used for exchanging signals with a user. For example, in some aspects, the user I/O interface 86 comprises various user input/output devices including, but not limited to, one or more display devices, a keyboard or keypad, a mouse, and the like.

The communications interface circuit 88 comprises circuitry configured to allow the BTVC 80 to communicate data and information with one or more computers and mass storage devices, such as database (DB) 94, via a communications network 92. Generally, communications interface circuit 88 comprises an ETHERNET card or other circuit specially configured to allow BTVC 80 to communicate data and information over communications network 92. However, in other aspects of the present disclosure, communications interface circuit 48 includes a transceiver configured to send and receive communication signals to and from another device, such as DB 94, via a wireless communications network.

Figure 6:
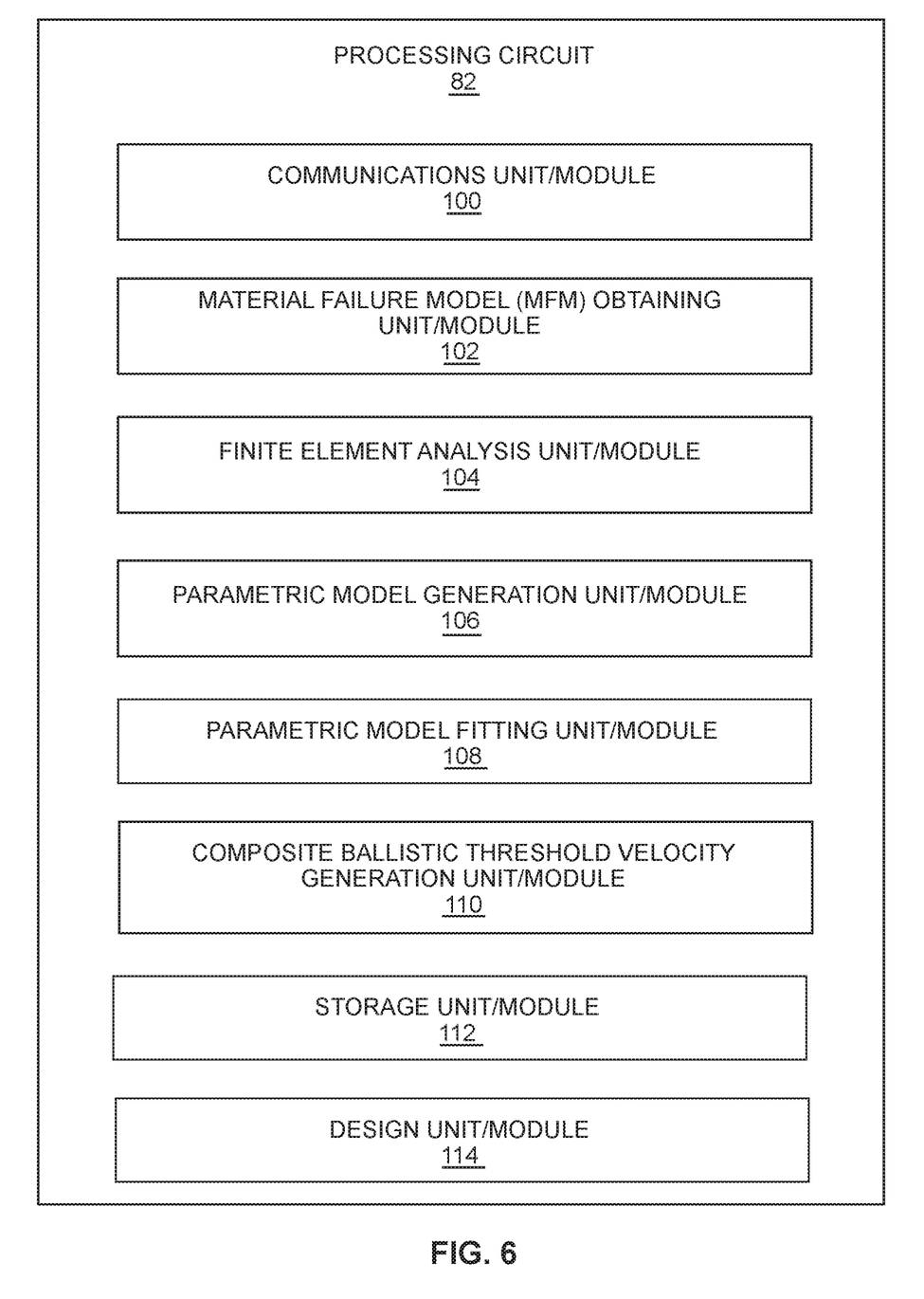
FIG. 6 is a block diagram illustrating a processing circuit implemented according to different hardware units and software modules according to one aspect of the present disclosure.

FIG. 6 is a block diagram illustrating processing circuit 82 implemented according to different hardware units and software modules (e.g., as control program 90 stored in memory 84) according to one aspect of the present disclosure. As seen in FIG. 6, processing circuit 82 implements a communication unit/module 100, an MFM obtaining unit/module 102, a finite element analysis unit/module 104, a parametric model generation unit/module 106, a parametric model fitting unit/module 108, a composite ballistic threshold velocity generation unit/module 110, a storage unit/module 112, and a design unit/module 114.

The communication unit/module 100 is configured to facilitate the communications of data and information between BTVC 80 and one or more remote devices, such as DB 94, for example, via communications network 92. The material failure model obtaining unit/module 102 is configured to retrieve the plurality of MFMs 32 from an external storage device, such as DB 94, from memory circuit 84, or both. In situations where one or more MFMs 32 do not exist or cannot be retrieved, the material failure model obtaining unit/module 102 generates those MFMs 32 based on information and data provided, for example, by a user via the user I/O interface 86.

The finite element analysis unit/module 104 is configured to perform different finite element analyses using the data and information contained in each of a plurality of MFMs 32. As previously stated, each of the plurality of MFMs 32 undergo a different finite element analysis resulting in the finite element analysis unit/module 104 outputting respective individual $V_{50}$ values for each MFM 32.

The parametric model generation unit/module 106 is configured to receive the individual V50 values from the finite element analysis unit/module 104 as input, and generate the parametric model 40 used to determine the composite $V_{50}$ value for panel 20. In particular, according to one aspect, the parametric model generation unit/module 106 generates the parametric model 40 to include each $V_{50}$ value received from the finite element analysis unit/module 104, and assigns, to each $V_{50}$ value, a corresponding weighting parameter $P_n$. The parametric model fitting unit/module 108 is configured to fit the generated parametric model 40 into test data 38 to determine the values for each weighting parameter $P_n$. The composite ballistic threshold velocity generation unit/module 110 computes the composite $V_{50}$ for panel 20 based on the generated parametric model 40, and outputs that computed value to the storage unit/module 112 for storage in memory. The design unit/module 114 is configured to design a panel, such as panel 20, according to the composite $V_{50}$ stored in memory.

Figure 7:
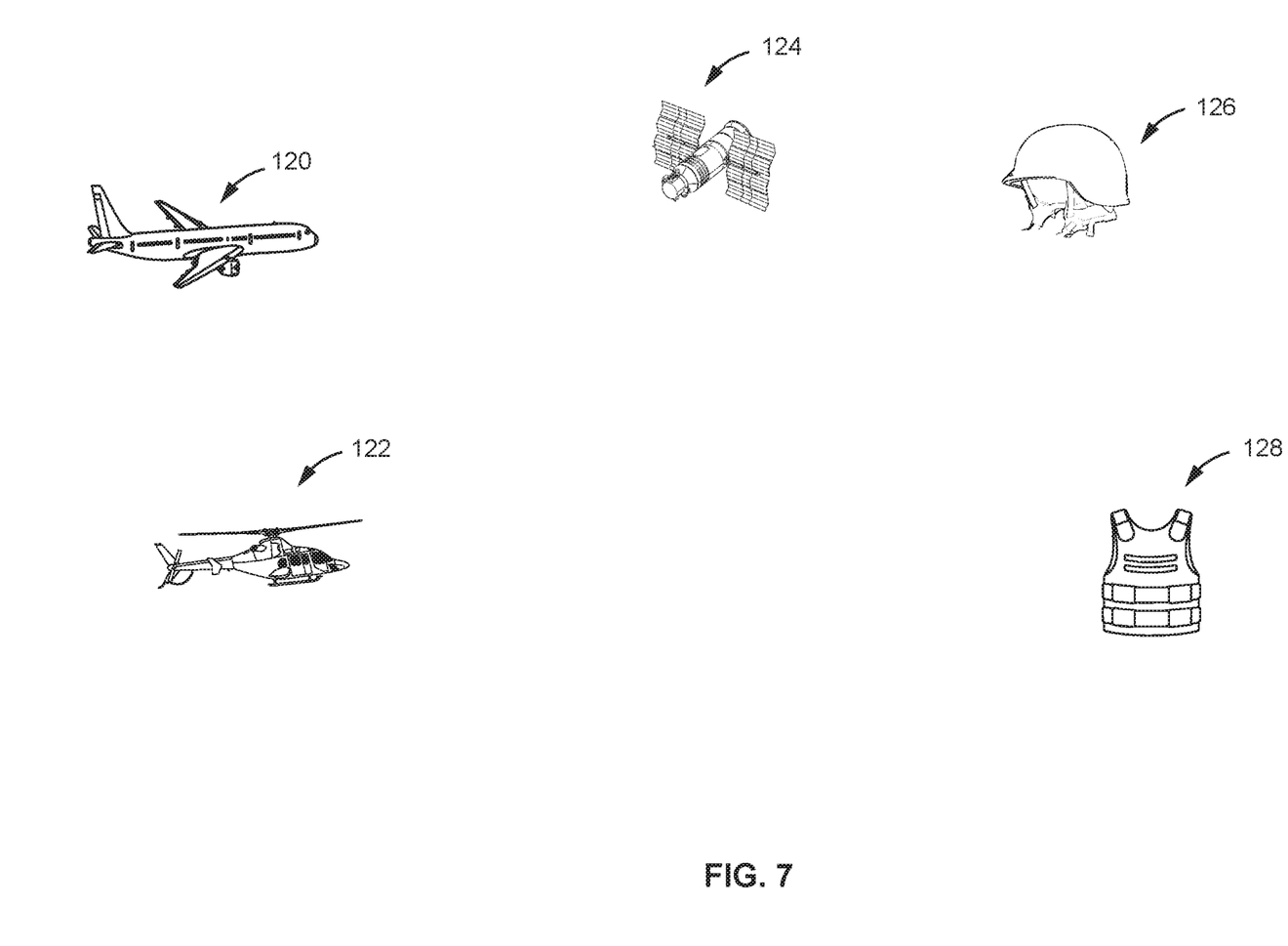
FIG. 7 is a schematic illustration of some exemplary types of objects created using a composite $V_{50}$ value determined according to the present aspects.

From the design, a variety of different objects can be manufactured. For example, as seen in FIG. 7, the composite $V_{50}$ value determined according to the present aspects can be utilized to manufacture parts for a vehicle, such as an aircraft 120, a rotorcraft 122, and satellite 124. In addition, however, the composite $V_{50}$ value determined according to the present aspects can be utilized to manufacture protective articles of clothing that are worn by a user. Such articles include, but are not limited to, protective headgear 126 (e.g., a helmet designed to withstand or resist ballistic impacts) and anti-ballistic vests 128, such as those worn by soldiers and law enforcement personnel.

Aspects of the present disclosure further include various methods and processes, as described herein, implemented using various hardware configurations configured in ways that vary in certain details from the broad descriptions given above. For instance, one or more of the processing functionalities discussed above may be implemented using dedicated hardware, rather than a microprocessor configured with program instructions, depending on, e.g., the design and cost tradeoffs for the various approaches, and/or system-level requirements.

The foregoing description and the accompanying drawings represent non-limiting examples of the methods and apparatus taught herein. As such, the aspects of the present disclosure are not limited by the foregoing description and accompanying drawings. Instead, the aspects of the present disclosure are limited only by the following claims and their legal equivalents.

What is claimed is:

1. A computing device comprising:
   a communication interface circuit configured to communicate data with one or more devices over a communications network; and
   one or more processing circuits operatively connected to the communication interface circuit and configured to:
   generate a parametric model configured to aggregate predicted ballistic threshold velocities of a plurality of material failure models (MFMs) associated with a composite structure, wherein each predicted ballistic threshold velocity in the parametric model has a corresponding weighting coefficient to be applied to the predicted ballistic threshold velocity;
   determine a value for each weighting coefficient in the parametric model;
   generate a composite ballistic threshold velocity for the composite structure from the parametric model;
   generate a structural design for the composite structure according to the composite ballistic threshold velocity; and
   create the composite structure according to the structural design generated for the composite structure.

2. The computing device of claim 1 wherein each MFM comprises data defining one or both of a characteristic and a physical property of materials comprising the composite structure.

3. The computing device of claim 2 wherein the one or more processing circuits are further configured to generate the predicted ballistic threshold velocity for each MFM according to a selected finite element solving algorithm.

4. The computing device of claim 3 wherein the finite element solving algorithm used to generate the predicted ballistic threshold velocity for a first MFM is different than the finite element solving algorithm used to generate the predicted ballistic threshold velocity for a second MFM.

5. The computing device of claim 3 wherein the one or more processing circuits are further configured to generate at least one predicted ballistic threshold velocity using a stress-based failure analysis of the composite structure.

6. The computing device of claim 3 wherein the one or more processing circuits are further configured to generate at least one predicted ballistic threshold velocity using a fracture-based failure analysis of the composite structure.

7. The computing device of claim 3 wherein the one or more processing circuits are further configured to generate at least one predicted ballistic threshold velocity using a continuum damage failure analysis of the composite structure.

8. The computing device of claim 1 wherein to determine a value for each weighting coefficient, the one or more processing circuits are further configured to:
   fit the parametric model to empirical test data for the composite structure responsive to determining that the empirical test data is accessible; and
   obtain weighting coefficients from a previously generated parametric model responsive to determining that the empirical test data is not accessible.

9. The computing device of claim 1 wherein the one or more processing circuits are further configured to determine whether the composite ballistic threshold velocity is within a predetermined range of a reference ballistic threshold velocity.

10. A method of determining a ballistic threshold velocity for a composite structure, the method comprising:
    generating a parametric model configured to aggregate predicted ballistic threshold velocities of a plurality of material failure models (MFMs) associated with the composite structure, wherein each predicted ballistic threshold velocity in the parametric model has a corresponding weighting coefficient to be applied to the predicted ballistic threshold velocity;

determining a value for each weighting coefficient in the parametric model;

generating a composite ballistic threshold velocity for the composite structure from the parametric model;

generating a structural design for the composite structure according to the composite ballistic threshold velocity; and creating the composite structure according to the structural design generated for the composite structure.

11. The method of claim 10 further comprising generating the predicted ballistic threshold velocity for each MFM using a corresponding different finite element analysis solving algorithm.

12. The method of claim 11 wherein generating the predicted ballistic threshold velocity for each MFM comprises generating at least one predicted ballistic threshold velocity using a stress-based failure analysis of the composite structure.

13. The method of claim 11 wherein generating the predicted ballistic threshold velocity for each MFM comprises generating at least one predicted ballistic threshold velocity using a fracture-based failure analysis of the composite structure.

14. The method of claim 11 wherein generating the predicted ballistic threshold velocity for each MFM comprises generating at least one predicted ballistic threshold velocity using a continuum damage failure analysis of the composite structure.

15. The method of claim 10 wherein determining a value for each weighting coefficient in the parametric model comprises fitting the parametric model to empirical test data for the composite structure responsive to determining that the empirical test data is accessible.

16. The method of claim 15 wherein determining a value for each weighting coefficient in the parametric model comprises obtaining weighting coefficients from a previously generated parametric model responsive to determining that the empirical test data is not accessible.

17. The method of claim 10 further comprising determining whether the composite ballistic threshold velocity is within a predetermined range of a reference ballistic threshold velocity.

18. The method of claim 10 wherein the composite structure comprises part of a vehicle.

19. The method of claim 10 wherein the composite structure comprises part of a protective article of clothing worn by a user.

20. A non-transitory computer-readable medium storing a computer program product configured to control a programmable computing device, the computer program product comprising software instructions that, when executed by processing circuitry of the programmable computing device, cause the processing circuitry to:

generate a parametric model configured to aggregate predicted ballistic threshold velocities of a plurality of material failure models (MFMs) associated with a composite structure, wherein each predicted ballistic threshold velocity has a corresponding weighting coefficient to be applied to the predicted ballistic threshold velocity;

fit the parametric model to empirical test data to determine a value for each weighting coefficient in the parametric model;

generate a predicted composite ballistic threshold velocity for the composite structure from the parametric model; and generate a structural design for the composite structure according to the composite ballistic threshold velocity; and create the composite structure according to the structural design generated for the composite structure.

* * * * *